(12) United States Patent
Haid

(10) Patent No.: US 8,897,511 B2
(45) Date of Patent: *Nov. 25, 2014

(54) METHOD AND DEVICE FOR DETECTING A HAND-WRITTEN SIGNATURE OR MARK AND FOR RECOGNISING THE AUTHENTICITY OF SAID SIGNATURE OR MARK

(75) Inventor: Markus Haid, Stuttgart (DE)

(73) Assignee: SOFTPRO GmbH (DE)

( * ) Notice: Subject to any disclaimer, the term of this patent is extended or adjusted under 35 U.S.C. 154(b) by 869 days.

This patent is subject to a terminal disclaimer.

(21) Appl. No.: 13/025,961

(22) Filed: Feb. 11, 2011

(65) Prior Publication Data

US 2011/0135169 A1 Jun. 9, 2011

Related U.S. Application Data

(63) Continuation of application No. 11/573,937, filed as application No. PCT/EP2005/008970 on Aug. 19, 2005, now Pat. No. 7,889,889.

(30) Foreign Application Priority Data

Aug. 21, 2004 (DE) .......................... 10 2004 040 607
Nov. 26, 2004 (DE) .......................... 10 2004 057 157

(51) Int. Cl.
*G06K 9/00* (2006.01)
*G07C 9/00* (2006.01)

(52) U.S. Cl.
CPC .......... *G06K 9/00154* (2013.01); *G07C 9/0015* (2013.01)
USPC ............ 382/120; 382/122; 345/156; 345/179

(58) Field of Classification Search
CPC ...................................................... G06F 3/017
USPC .................................. 345/156, 179; 382/120
See application file for complete search history.

(56) References Cited

U.S. PATENT DOCUMENTS

| 5,022,086 A | 6/1991 | Crane et al. |
| 5,559,895 A | 9/1996 | Lee et al. |
| 2007/0269083 A1* | 11/2007 | Haid .............................. 382/119 |
| 2008/0192005 A1* | 8/2008 | Elgoyhen et al. ............. 345/158 |

FOREIGN PATENT DOCUMENTS

WO 0062244 A1 10/2000

OTHER PUBLICATIONS

"Automatic Signature Verification and Writer Identification—The State of the Art";—Plamondon et al. (Pattern Recognition, vol. 22, No. 2, Mar. 1, 1989, pp. 107-131).

* cited by examiner

*Primary Examiner* — Abbas Abdulselam
*Assistant Examiner* — Shawna Stepp Jones
(74) *Attorney, Agent, or Firm* — David I. Roche; Baker & McKenzie LLP

(57) ABSTRACT

A method and device for registering a handwritten personal signature and for judging its authenticity by comparison with previously registered measured values and data derived therefrom. Signature data is acquired by registering a signature handwritten on a surface by a three-dimensional inertial sensing system having rate-of-rotation sensors and linear acceleration sensors. The data is subjected to a subsequent procedure of recognition or verification or comparison with other signatures. Hence not only tracking is performed with reference to the tip of a writing implement, but the dynamics of the signature are registered and evaluated by numerical calculation and adopted as the basis for the subsequent comparison, effectively ruling out the possibility of fraudulent duplication or tracing-over of a signature by an unauthorized third party. The dynamics i.e. acceleration and deceleration phenomena and rates of rotation as the signature are executed and effectively registered. From them, supplementary measured variables are calculated and specific characteristics are defined from those variables. Those variables are adopted as the basis for comparison, the degree of accuracy of the verification that the signature is genuine can be substantially increased.

25 Claims, 2 Drawing Sheets

METHOD AND DEVICE FOR DETECTING A HAND-WRITTEN SIGNATURE OR MARK AND FOR RECOGNISING THE AUTHENTICITY OF SAID SIGNATURE OR MARK

This application is a continuation of, and is based on and claims priority to U.S. patent application Ser. No. 11/573,937, which was filed on Feb. 19, 2007, now U.S. Pat. No. 7,889,880 issued Feb. 15, 2011, which is incorporated herein by reference.

The invention relates to a method for registering a handwritten personal signature in the broadest sense wherein the signature to be registered is handwritten on a surface or substrate, in particular an essentially two-dimensional surface or substrate, while being registered by means of a three-dimensional inertial sensing system. Thus, acceleration and/or rate-of-rotation values measured by sensors as the signature is being handwritten, i.e. inertial sensor signals in the broadest sense, are registered and are either stored in memory as such or are immediately or subsequently forwarded for further data processing in order to derive therefrom in particular digitally storable data which can then be used for comparison with corresponding data from another signature.

One such method is already known from WO-A-98/12661. According to this prior art, a first data stream is registered on the basis of a two-dimensional tracking, and a second data stream is registered on the basis of six degrees of freedom in space (six-dimensional tracking); in addition, contact with the writing substrate is monitored and reflected in a third data stream and, as a fourth data stream, a time-control is adopted as a reference in the data sampling of the first three data streams. What all this amounts to is that two-dimensional tracking on the writing substrate and three-dimensional tracking with orientation monitoring are combined. This is claimed to give greater accuracy.

The fundamental problem of the present invention is that of further increasing certainty of verification of the genuineness of a signature.

This is solved in accordance with the invention by a method with the features of Claim 1.

The gist of the present invention is that the dynamics i.e. the acceleration phenomena and rates of rotation as the signature is being handwritten are registered and are subjected to a subsequent procedure of recognition or verification or comparison with other signatures. Hence the point of the present invention is not, or not only, that tracking is performed, in particular with reference to the tip of a writing implement, but that the dynamics of the signature are registered and in particular evaluated by numerical calculation and adopted as the basis for the subsequent comparison. This can effectively rule out the possibility of fraudulent duplication or tracing-over of a signature by an unauthorized third party. Tracking alone would not enable the real signature to be distinguished from the bogus one. On the other hand, if the true dynamics i.e. acceleration and deceleration phenomena and rates of rotation as the signature is executed are effectively registered, and, from them, supplementary measured variables are calculated and specific characteristics are defined from those variables and adopted as the basis for comparison, the certainty of the verification that the signature is genuine can be substantially increased. This constitutes the nub of the present invention.

In achieving this, it is crucially important that even though the handwritten signature is executed on a surface i.e. a preferably substantially flat two-dimensional substrate, a three-dimensional inertial sensing system is used for registering the signature. This means that the full dynamics of the signature can be registered, in accordance with the invention.

The three-dimensional inertial sensing system comprises rate-of-rotation sensors and linear acceleration sensors. In addition, a pressure sensor can be used in the tip of an input device. The measured data could also be backed up by a magnetic field sensor giving an orientation with respect to the direction of the Earth's magnetic field, or of a magnetic field deliberately superimposed on the device.

In accordance with the invention, the inertial sensor signals, i.e. acceleration and rate-of-rotation values measured by sensors, and data derived therefrom, are directly adopted and stored in memory and used as basic measured variables for comparison. However, further supplementary measured variables may, in particular additionally, be determined therefrom by integration, stored in memory, and used for comparison, such as velocity values and/or positional values and data. Also, signals from rate-of-rotation sensors and data derived therefrom can be directly adopted as basic measured variables, stored in memory, and used for comparison; also, in particular additionally, angles of rotation determined therefrom by integration, as further supplementary measured variables.

If the supplementary measured variables mentioned above are velocities, they are obtained by single integration of measured acceleration values. If the supplementary measured variables are distances or positional values, they are obtained by double integration of measured acceleration values. If the supplementary measured variables are angles, they are obtained by single integration of the values measured by the rate-of-rotation sensors.

It has proved advantageous to represent each of the measured variables by a data stream with i elements, i being the product of the duration of the recordal of the signature, i.e. the duration of data acquisition, and the data sampling frequency.

Each measured variable of a signature, in particular in the form of its data stream, could be directly compared with the corresponding measured variable and data stream of another signature to check that the signatures match and have therefore been made by the same person, with the acceleration and deceleration characteristic peculiar to that person. For this check, however, it may also be advantageous to define several characteristics ($b_i$) for each basic measured variable and preferably also for each further calculated variable, and in particular Overall Minimum: smallest value recorded over the total duration of the signature;
Position of Minimum: position of overall minimum as offset in seconds, measured from the start of the signature;
Overall Maximum: largest value recorded over the total duration of the signature;
Position of Maximum: position of overall maximum as offset in seconds, measured from the start of the signature;
Number of Zero Points: number of zero points from the start to the end of the signature;
Distance of Zero Points: the average interval in seconds between all successive zero points over the total duration of the signature in seconds;
Number of Minima: number of local minima from the start to the end of the signature;
Average Minimum: average value of all local minima over the total duration of the signature;
Number of Maxima: number of local maxima from the start to the end of the signature;
Average Maximum: average value of all local maxima over the total duration of the signature;

Average Positive Slope: average of all slopes with a positive value at the zero points between start and end of the signature;

Average Negative Slope: average of all slopes with a negative value at the zero points between start and end of the signature;

Length of Signature: length of the signature in seconds from start to end.

Thus, in carrying out such a check, the behaviour of the measured value of a variable, or the behaviour of further variables calculated therefrom, over the duration of the recordal of the signature are examined; and from this behaviour one or more characteristics similar to the examples listed above are defined.

In order that the above-mentioned comparison of signatures can be carried out, the characteristics ($b_i$) of an individual measured variable (B) are combined in a vector ($\hat{B}$), and for the comparison of two signatures, vectors of the individual variables are compared with each other by applying a yardstick.

It has proved advantageous to adopt as yardstick a measurement of similarity that is defined as an interval or distance measurement. in particular as a Euclidian distance. To ascertain whether two observed variables of two signatures originate from the same person, their distance is calculated on the basis of the vectors produced $\hat{B}$, $\hat{C}$ with the respective characteristics $b_i$, $c_i$ and of the length n of the vectors (=number of components), adopting Euclidian distance.

$$\operatorname{dist}(\hat{B}, \hat{C}) = \sqrt{\sum_{i=1}^{n} (b_i - c_i)^2 / n}$$

In order to be able to calculate the distance of two vectors $\hat{B}$, $\hat{C}$, their dimensions must correspond. The sum of the squares of the intervals is moreover divided by the number of elements n of a vector. This standardization renders distances comparable whose basic vector-pairs have different lengths, i.e. different numbers of components.

It would be quite possible to use this distance measurement of two vectors for comparing signatures. Nevertheless it has proved advantageous to use not a measurement of distance, but a measurement of similarity. Whereas in the case of distance a small value corresponds to a good match between vectors, in the case where a measurement of similarity is adopted a small value corresponds to a poor match. An easy way of converting a distance measurement into a measurement of similarity is to multiply by −1:

$$s(\hat{B}, \hat{C}) = -\operatorname{dist}(\hat{B}, \hat{C}).$$

A value of zero denotes a perfect match. The smaller the value, the greater the dissimilarity between the two vectors and hence the measured variables forming the basis for calculation of these vectors.

Some characteristics that arise in the representation of signatures are found to be more telling than others. For instance, the number of zero points or the length of the signature are more meaningful than the average value of all positive slopes. Hence it is in the interest of the quality of the signature-recognition to give greater emphasis to highly expressive characteristics than to less expressive ones when comparing vectors. This can be done by weighting some individual characteristics more heavily than others. With this in mind, the following actions may advantageously be taken:

Scaling a characteristic $b_i$ by multiplying by a constant $C_R$;

Conversion of the characteristic $b_i$ into a percentage of a constant value $p_r$, which corresponds to 100%.

It has moreover proved particularly advantageous to detect the start and end of the handwritten signature as part of the registration. This can prevent movements during the actual recordal time that do not originate from the actual signature from being picked up in the comparison, particularly in the calculation of characteristics, and from falsifying the results.

It has proved particularly advantageous to establish the start and end of the signature by reference to the slope of the sensor-measured values at the zero points, identifying the zero point whose slope exceeds a pre-defined value as the start of the signature. Thus a signature starts at the zero point whose slope is the first to exceed a pre-defined value, as can be determined by a threshold value check. A signature ends at the zero point whose slope is the last to exceed the same pre-defined value.

The invention also relates to a device for carrying out the method according to the invention and specifically both a device for registering an original "genuine" handwritten personal signature and further signatures needing to be checked, and a device for carrying out this check. The device according to the invention includes an input device which can be guided by hand and which can in particular be constructed in the form of a pen or writing implement. This input device then contains the three-dimensional inertial sensing system. It may additionally include evaluation means for processing values measured by the inertial sensing system, and a memory device. However, it would also be feasible for the device, and in particular the input device, to comprise an interface for communicating data to an external computing device and/or a memory device and/or a display device.

The device also comprises means for comparing measured values or data from different handwritten signatures. If—as described previously—characteristics are defined and determined from measured values or data on specific measured variables, and the comparison is to be made on the basis of these derived characteristics, then the claimed device also comprises means for calculating such characteristics of the respective measured variables.

The invention moreover relates to the use of a three-dimensional inertial sensing system for the registration and/or recognition of a personal signature in the broadest sense handwritten on an essentially two-dimensional surface, by registering the dynamics (acceleration, rate of rotation) of the handwritten personal signature and taking these dynamics into account in the recognition or comparison with other signatures.

Further features, particulars and advantages of the invention will follow from the accompanying claims and from the graphic illustration of one preferred embodiment of the invention. In the drawing:

The method according to the invention caters for signature recognition without a frame of reference. Hence the signature to be checked does not have to be produced on a "tablet" or "pad" or special printed barcode-type form, but can in principle be made on any desired surface. The method can be used for registering a signature normally consisting of two or three words. According to experience, the signing process lasts from 1 up to a maximum of 10 seconds. On this timescale, the drift of inertial sensors is relatively insignificant. This being so, it is possible to conduct a biometrically reliable signature-recognition whilst retaining the advantage of referenceless data-acquisition. The signature can be produced on any desired writing surface.

Figure 1:
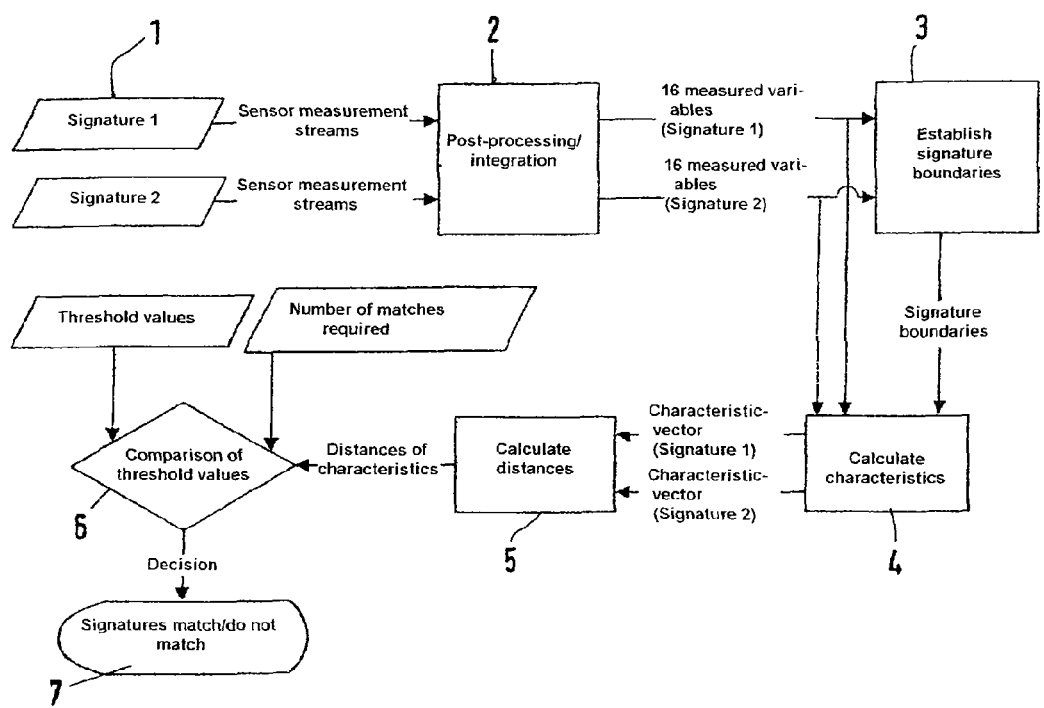
FIG. 1 is a flow chart explaining the steps in the registration and comparison of signatures.

FIG. 1 shows the sequence of the method steps to be performed in accordance with one embodiment of the invention. Two signatures that are to be compared with each other are made by hand on a writing surface, and are registered. This process of registration is here represented as if it were a parallel operation for signatures 1 and 2. In practice these operations are separated in both time and space. Specifically, an authorized person will first of all furnish a handwritten signature to serve as a permanent record; on that occasion, the signature will be registered in the manner described below, and filed in any chosen manner and at any chosen location as a biometric datum, identifying mark or individualizing characteristic. The purpose of the signature recognition is to make it possible to check the genuineness of a signature that is provided at a later time and at some other location; that is to say, to ascertain whether it originates from the same authorized person or has been duplicated by an unauthorized person for fraudulent purposes.

Figure 2:
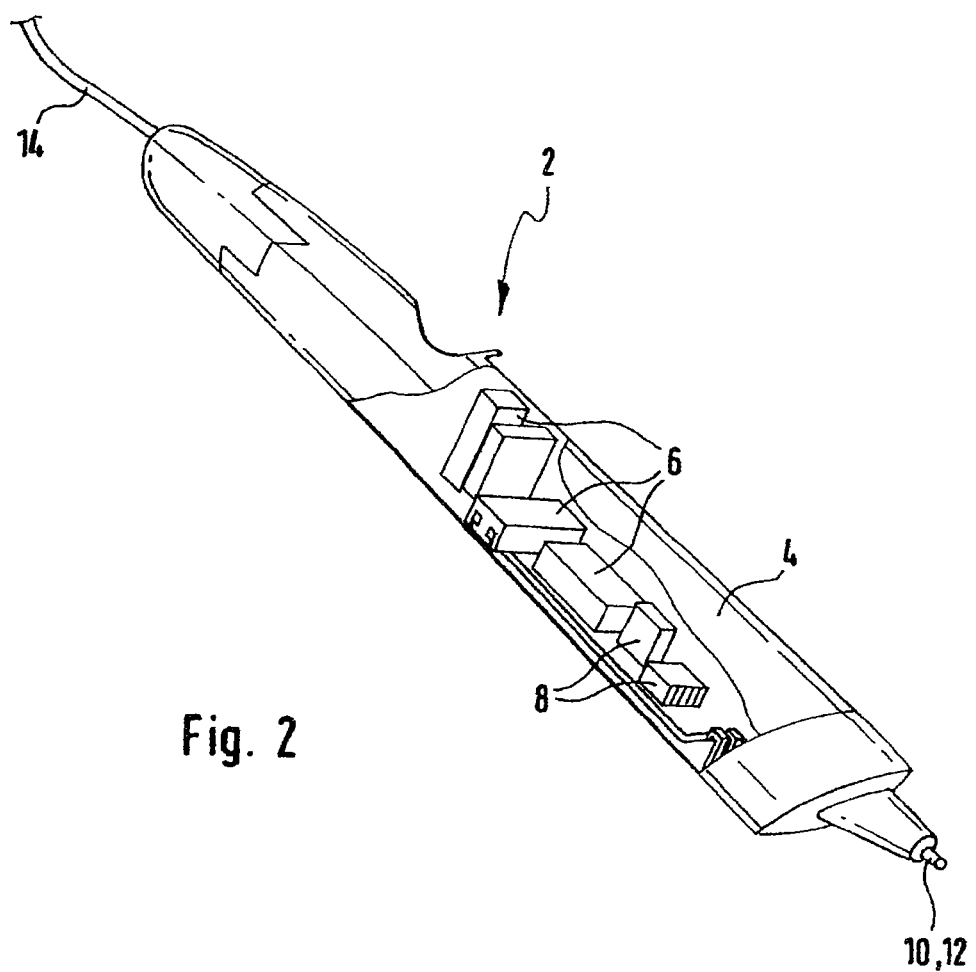
FIG. 2 shows a device in the form of a writing implement.

In any case the signatures 1 and 2 to be compared with each other are handwritten on a writing surface in a Method Step 1 (see FIG. 1) while being registered by means of a three-dimensional inertial sensor system. The device 2 according to the invention which is used for this purpose is constructed in the form of a writing implement 4, in particular a pen, which carries the three-dimensional inertial sensor system, and is shown schematically in FIG. 2. Preferably, three acceleration sensors 6 orientated in the three directions in space at a predetermined angle of preferably 90° to each other, and three rate-of-rotation sensors 8, are used. In the present example, a force sensor 10 at the pen tip 12 of the input device 2 is also used. Thus a total of seven sensors are provided (six inertial sensors and one force or pressure sensor) to record measured values during the execution of the signature, at a predetermined sampling frequency of approx. 0.3 kHz to 3 kHz, these recorded values then being stored in the form of a data stream in a memory device. For this purpose, the writing implement 4 shown by way of example has a data line 4 serving as a link for passing measured values and data to a computer. The data line can be used bidirectionally.

The measured acceleration data and values measured by rate-of-rotation sensors form six so-called basic measured variables. In Step 2, a further nine variables are additionally derived by calculation from these measured values, viz. three velocity values, by single integration of the three measured acceleration values, three positional values, by double integration of the measured acceleration values, and three rotational angles, by single integration of the values measured by the rate-of-rotation sensors. A further measured variable is furnished by the force or pressure sensor. This gives a total of sixteen measured variables to be used for the comparison of the signatures.

With the aid of these measured variables—sixteen in the case illustrated by way of example (seven basic measured variables plus nine supplementary measured variables derived therefrom)—, the boundaries of the signature, i.e. the start and end of the handwritten personal signature, are determined in Step 3. This will prevent movements during the overall data-recording time that do not originate from the signature from being picked up in the evaluation and from falsifying the results. The start and end of a handwritten signature are determined from the slope at the zero points. A signature starts at the zero point whose slope is the first to exceed a pre-defined value. A signature ends at the zero point whose slope is the last to exceed the same pre-defined value.

Next, in Step 4, characteristics are defined, and/or predefined characteristics determined, preferably for each of the sixteen measured variables, using the respective data streams of the measured variables. As the outcome of this determination, a characteristic vector $\hat{B}$ is obtained—preferably for each measured variable—whose components comprise the respective characteristics $b_i$. In accordance with a preferred embodiment of the method according to the invention, the following characteristics are defined and calculated preferably for each measured variable and filed as a characteristic vector which is then available for further processing, and is preferably stored in memory:

Overall Minimum: smallest value recorded over the total duration of the signature;

Position of Minimum: position of overall minimum as offset in seconds, measured from the start of the signature;

Overall Maximum: largest value recorded over the total duration of the signature;

Position of Maximum: position of overall maximum as offset in seconds, measured from the start of the signature;

Number of Zero Points: number of zero points from the start to the end of the signature;

Distance of Zero Points: the average interval in seconds between all successive zero points over the total duration of the signature in seconds;

Number of Minima: number of local minima from the start to the end of the signature;

Average Minimum: average value of all local minima over the total duration of the signature;

Number of Maxima: number of local maxima from the start to the end of the signature;

Average Maximum: average value of all local maxima over the total duration of the signature;

Average Positive Slope: average of all slopes with a positive value at the zero points between start and end of the signature;

Average Negative Slope: average of all slopes with a negative value at the zero points between start and end of the signature;

Length of Signature: length of the signature in seconds from start to end.

Calculation of the individual characteristics $b_i$ and characteristic vectors $\hat{B}$ is based solely on the measured values or data of the basic measured variables and supplementary measured variables that have been determined between the start and end of the handwritten signature, i.e. not on all measured values and data over the entire recordal period.

In a further Method Step 5, the characteristic vectors are compared with the aid of a yardstick which in the case illustrated by way of example is a measure of similarity. In Step 5 this is done by first of all calculating a distance in the form of the Euclidian distance of two characteristic vectors $\hat{B}$ and $\hat{C}$ that refer to the same measured variable but belong to different signatures 1 and 2. The sum of the squares of the distances is obtained and divided by the number of elements n of the vectors. This standardization makes it possible to compare distances whose basic vector-pairs have different lengths.

However, it has proved advantageous to adopt for a comparison, in particular for a threshold value comparison, not the distance of two characteristic vectors but a measure of similarity $s(B,C)$ obtained therefrom.

$$s(\hat{B}, \hat{C}) = -\text{dist}(\hat{B}, \hat{C}).$$

$$\text{dist}(\hat{B}, \hat{C}) = \sqrt{\sum_{i=1}^{n}(b_i - c_i)^2 / n}$$

A perfect match is represented by a value of zero for $s(\hat{B},\hat{C})$. The smaller the value of $s(\hat{B},\hat{C})$, the greater the dissimilarity between the two biometric characteristics.

Some characteristics that arise in the recognition or comparison of handwritten signatures have been found to be more telling than others. Such characteristics are therefore advantageously weighted more heavily, namely by scaling the particular characteristic $b_i$ by multiplying by a constant $C_R$, or by converting the characteristic $b_i$ into a percentage of a constant value $p_r$, which corresponds to 100%.

The result in Step 5 is in this instance a modified measure of the distance of the characteristic vectors; characteristic vectors having preferably been determined for all measured variables and the modified distance having been determined for each vector-pair. From the distances, Step 6 establishes in how many measured variables the signatures 1 and 2 correspond, by subjecting each distance of vector-pairs to a threshold value comparison. The number of matches of the measured variables is then determined and compared with a required number of matches that can be preset. Depending on the outcome of this comparison, a decision is made that the signatures do or do not match. This is displayed, in particular visually, in Step 7. Depending on this outcome, authorization can then be given or refused, in whatever way may be appropriate.

The invention claimed is:

1. A system for registering a handwritten signature and for judging its authenticity, the system comprising:
   a three-dimensional inertial sensing system comprising at least one rate-of-rotation sensor and at least one linear acceleration sensor, wherein the three-dimensional inertial sensing system can be guided on a surface to execute a first handwritten signature;
   a data generating unit for generating data for each of a plurality of measured values, wherein the plurality of measured values is measured by the at least one acceleration sensor and by the at least one rate-of-rotation sensor;
   a link for passing the measured values from the three-dimensional inertial sensing system to the data generating unit;
   a calculating unit for calculating characteristics for the data;
   a memory for storing at least one of the measured values, the data and the characteristics; and
   a comparing unit for comparing the characteristics with corresponding characteristics calculated for data of a second handwritten signature.

2. The system according to claim 1, further comprising:
   an input device comprising the three-dimensional inertial sensing system.

3. The system according to claim 2, wherein the input device is constructed in the form of a pen.

4. The system according to claim 2, wherein the input device is constructed as a writing implement.

5. The system according to claim 1, wherein the at least one rate-of-rotation sensor comprises three sensors, and the at least one linear acceleration sensor comprises three sensors.

6. The system according to claim 1, wherein the three-dimensional inertial sensing system additionally comprises at least one magnetic field sensor, and wherein the data generating unit is further configured for generating data for measured values measured by the magnetic field sensor.

7. The system according to claim 1, further comprising:
   a pressure sensor;
   wherein the a data generating unit is further configured for generating data for measured values measured by the pressure sensor.

8. The system according to claim 1, wherein the data generating unit is configured for generating the data as a plurality of data streams with i elements, i being the product of the duration of data acquisition and the data sampling frequency.

9. The system according to claim 1, further comprising:
   a supplementary data generating unit for generating supplementary data from each of the measured values, wherein the calculating unit is further configured for calculating characteristics for each of the supplementary data.

10. The system according to claim 9, wherein the supplementary data generating unit is configured for generating velocities by single integration of the values measured by the at least one acceleration sensor.

11. The system according to claim 9, wherein the supplementary data generating unit is configured for generating traversed distances by double integration of the values measured by the at least one acceleration sensor.

12. The system according to claim 9, wherein the supplementary data generating unit is configured for generating angles by single integration of the values measured by the at least one rate-of-rotation sensor.

13. The system according to claim 1, wherein the calculating unit is configured to calculate as characteristics:
   Overall minimum: smallest value recorded over the total duration of the handwritten signature;
   Position of minimum: position of overall minimum as offset in seconds, measured from the start of the handwritten signature;
   Overall maximum: largest value recorded over the total duration of the handwritten signature;
   Position of maximum: position of overall maximum as offset in seconds, measured from the start of the handwritten signature;
   Number of zero points: number of zero points from the start to the end of the handwritten signature;
   Distance of zero points: the average interval in seconds between all successive zero points over the total duration of the handwritten signature in seconds;
   Number of minima: number of local minima from the start to the end of the handwritten signature;
   Average minimum: average value of all local minima over the total duration of the handwritten signature;
   Number of maxima: number of local maxima from the start to the end of the handwritten signature;
   Average maximum: average value of all local maxima over the total duration of the handwritten signature;
   Average positive slope: average of all slopes with a positive value at the zero points between start and end of the handwritten signature;
   Average negative slope: average of all slopes with a negative value at the zero points between start and end of the handwritten signature;
   Length of signature: length of the handwritten signature in seconds from start to end.

14. The system according to claim 1, further comprising:
   a combining unit for combining the characteristics of the data of the first handwritten signature to obtain a vector for the data generated for each measured value of the first handwritten signature;
   wherein the memory is configured for storing each vector, and wherein the comparing unit is further configured for comparing the vectors with corresponding vectors of data of the second handwritten signature to determine a similarity of the first and second handwritten signatures.

15. The system according to claim 14, wherein the comparing unit is further configured for determining the similarity based on a comparison of a Euclidian distance.

16. The system according to claim 14, wherein the comparing unit is further configured for determining the similarity based on a multiplication of a Euclidian measure.

17. The system according to claim 14, further comprising:
a weighting unit for weighting the characteristics of a vector for the execution of the comparison.

18. The system according to claim 1, further comprising:
an evaluation unit for evaluating the start and end of the handwritten signature.

19. The system according to claim 18, wherein the evaluation unit is configured for evaluating the start and end by reference to a slope at zero points and by identifying the zero point whose slope exceeds a pre-defined value as the start of the handwritten signature.

20. The system according to claim 19, wherein the calculating unit is configured for calculating the characteristics only based on the data of measured values that were measured between the start and end of the handwritten signature.

21. The system according to claim 1, further comprising:
a counting unit for determining a number of matches of respective characteristics of the first and second handwritten signature; and
a matching unit for determining a match of the first and second handwritten signature by comparing the number of matches with a preset number of matches.

22. The system according to claim 1, further comprising:
an interface for communicating measured values and/or data to an external computing device and/or memory device and/or display device.

23. A system for judging the authenticity of a handwritten signature, the system comprising:
a three-dimensional inertial sensing system comprising at least one rate-of-rotation sensor and at least one linear acceleration sensor, wherein the three-dimensional inertial sensing system can be guided on a surface to execute a handwritten signature;
a data generating unit for generating data for each of a plurality of measured values, wherein the measured values are measured by the at least one acceleration sensor and by the at least one rate-of-rotation sensor;
a link for passing the measured values from the three-dimensional inertial sensing system to the data generating unit;
a calculating unit for calculating characteristics for the data;
a memory for storing at least one of the measured values, the data and the characteristics; and
a comparing unit for comparing the characteristics with corresponding characteristics calculated for data of another handwritten signature.

24. A system for registering a handwritten signature and for judging its authenticity, the system comprising:
a three-dimensional inertial sensing system comprising at least one rate-of-rotation sensor and at least one linear acceleration sensor, wherein the three-dimensional inertial sensing system can be guided on a surface to execute a first handwritten signature;
an evaluation device for processing measured values from the three-dimensional inertial sensing system into data storable in a memory, wherein the evaluation device is further configured for calculating characteristics for the data and for comparing the characteristics with corresponding characteristics calculated for data of a second handwritten signature;
a link for passing the measured values from the three-dimensional inertial sensing system to the evaluation device; and
the memory for storing the data units, the measured values and/or the characteristics.

25. A system for judging the authenticity of a handwritten signature, the system comprising:
a three-dimensional inertial sensing system comprising at least one rate-of-rotation sensor and at least one linear acceleration sensor, wherein the three-dimensional inertial sensing system can be guided on a surface to execute a handwritten signature;
an evaluation device for processing measured values from the three-dimensional inertial sensing system into data storable in a memory, wherein the evaluation device is further configured for calculating characteristics for the data and for comparing the characteristics with corresponding characteristics calculated for data of another handwritten signature;
a link for passing the measured values from the three-dimensional inertial sensing system to the evaluation device; and
the memory for storing the data units, the measured values and/or the characteristics.

* * * * *